United States Patent
Limpibunterng et al.

(10) Patent No.: US 9,327,764 B2
(45) Date of Patent: May 3, 2016

(54) VEHICLE CONTROL APPARATUS

(75) Inventors: Theerawat Limpibunterng, Susono (JP); Yoshiaki Tsuchiya, Miyoshi (JP); Hirofumi Nitta, Obu (JP); Shoji Asai, Nagoya (JP)

(73) Assignees: AISIN SEIKI KABUSHIKI KAISHA, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 201 days.

(21) Appl. No.: 13/500,025

(22) PCT Filed: Oct. 5, 2010

(86) PCT No.: PCT/IB2010/002514
§ 371 (c)(1),
(2), (4) Date: Apr. 3, 2012

(87) PCT Pub. No.: WO2011/042791
PCT Pub. Date: Apr. 14, 2011

(65) Prior Publication Data
US 2012/0197496 A1 Aug. 2, 2012

(30) Foreign Application Priority Data
Oct. 6, 2009 (JP) .................................. 2009-232852

(51) Int. Cl.
*B62D 6/00* (2006.01)
*B62D 15/02* (2006.01)
(Continued)

(52) U.S. Cl.
CPC .............. *B62D 15/025* (2013.01); *B62D 1/286* (2013.01); *B62D 6/04* (2013.01)

(58) Field of Classification Search
CPC .............. B62D 6/00; B62D 1/00; B62D 5/00; B60T 2201/00; B60W 30/00
USPC ...................... 701/1, 23, 28, 36, 41, 300, 301; 180/443, 446
See application file for complete search history.

(56) References Cited

U.S. PATENT DOCUMENTS 5,925,082 A * 7/1999 Shimizu et al. ................. 701/41
6,185,492 B1 * 2/2001 Kagawa et al. ................. 701/41
(Continued)

FOREIGN PATENT DOCUMENTS

CN 101460353 A 6/2009
DE 198 30 548 A1 2/1999
(Continued)

OTHER PUBLICATIONS

Oct. 28, 2011 Japanese Office Action issued in Patent Application No. 2009-232852 (with partial translation).
(Continued)

*Primary Examiner* — Truc M Do
(74) *Attorney, Agent, or Firm* — Oliff PLC

(57) ABSTRACT

A vehicle control apparatus that controls a vehicle provided with a steering force applying device capable of applying steering force to induce a change in a steering angle of a steered wheel to the steered wheel, includes a difference detecting device that detects a positional difference that determines a relative positional relationship between a target running path to be maintained and the vehicle; a determining device that determines a control amount of the steering force applying device based on the detected positional difference; a controller that maintains a running path of the vehicle on the target running path by controlling the steering force applying device according to the determined control amount; a steering input detecting device that detects a steering input to a steering input device by a driver; and a correcting device that corrects a determining reference of the control amount of the steering force applying device such that, when a steering input is detected while the running path is maintained on the target running path, this steering input is reflected.

10 Claims, 8 Drawing Sheets

(51) Int. Cl.
*B62D 1/28* (2006.01)
*B62D 6/04* (2006.01)

(56) References Cited

U.S. PATENT DOCUMENTS

| | | | |
|---|---|---|---|
| 6,463,369 B2* | 10/2002 | Sadano et al. | 701/28 |
| 8,457,868 B2* | 6/2013 | Tange et al. | 701/116 |
| 2002/0007236 A1* | 1/2002 | Sadano et al. | 701/28 |
| 2002/0007239 A1* | 1/2002 | Matsumoto et al. | 701/41 |
| 2003/0078712 A1* | 4/2003 | Shimakage et al. | 701/41 |
| 2004/0262063 A1* | 12/2004 | Kaufmann et al. | 180/169 |
| 2006/0069481 A1* | 3/2006 | Kubota et al. | 701/41 |
| 2006/0142921 A1* | 6/2006 | Takeda | 701/70 |
| 2006/0217860 A1 | 9/2006 | Ihara | |
| 2007/0021889 A1* | 1/2007 | Tsuchiya | 701/41 |
| 2008/0091318 A1* | 4/2008 | Deng et al. | 701/41 |
| 2008/0091321 A1* | 4/2008 | Nishikawa | 701/44 |
| 2008/0255729 A1* | 10/2008 | Ichinose et al. | 701/42 |
| 2009/0024278 A1* | 1/2009 | Kondo et al. | 701/41 |
| 2009/0171533 A1* | 7/2009 | Kataoka | 701/41 |
| 2009/0216405 A1* | 8/2009 | Kudo | 701/41 |
| 2009/0299573 A1* | 12/2009 | Thrun et al. | 701/41 |
| 2010/0100284 A1* | 4/2010 | Kudo | B62D 15/025 701/42 |
| 2011/0022317 A1* | 1/2011 | Okita | B60W 30/12 701/301 |
| 2011/0257845 A1* | 10/2011 | Niki | B62D 54/046 701/41 |

FOREIGN PATENT DOCUMENTS

| | | |
|---|---|---|
| DE | 10 2006 034 198 A1 | 2/2007 |
| DE | 10 2007 061 900 A1 | 6/2009 |
| DE | 10 2008 002 669 A1 | 1/2010 |
| DE | 10 2009 022 054 A1 | 11/2010 |
| EP | 2 025 577 A1 | 2/2009 |
| EP | 2 088 059 A1 | 8/2009 |
| JP | A-09-207800 | 8/1997 |
| JP | A-11-245832 | 9/1999 |
| JP | A-2001-48034 | 2/2001 |
| JP | A-2007-30612 | 2/2007 |
| JP | A-2007-160998 | 6/2007 |

OTHER PUBLICATIONS

Mar. 2, 2011 Written Opinion of the International Searching Authority issued in Patent Application No. PCT/IB2010/002514.
Mar. 2, 2011 International Search Report issued in Patent Application No. PCT/IB2010/002514.

* cited by examiner

VEHICLE CONTROL APPARATUS

This application claims priority to Japanese Patent Application No. 2009-23252 filed On Oct. 6, 2009, the disclosure of which, including the specification, drawings and Abstract, is incorporated herein by refence in its entirety.

BACKGROUND OF THE INVENTION

1. Field of the Invention

The invention relates to the technical field of a vehicle control apparatus that controls a vehicle that is provided with, for example, EPS (Electric controlled Power Steering), VGRS (Variable Gear Ratio Steering), ARS (Active Rear Steering), or SBW (Steer By Wire) or the like, and configured to be able to realize a function that maintains a travel path of the vehicle on a target travel path, such as LKA (Lane Keeping Assist) or the like, using these functions.

2. Description of the Related Art

Japanese Patent Application Publication No. 2007-160998 (JP-A-2007-160998), for example, describes one such apparatus that takes into account an operation amount of a steering wheel by a driver while lane keeping assist is being performed. With the steering control apparatus described in JP-A-2007-160998, when the driver operates (i.e., turns) the steering wheel while lane keeping assist is being performed, interference between the steering wheel operation and steering control can be appropriately prevented by reducing the control amount related to steering control according to that operation amount.

Also, Japanese Patent Application Publication No. 2007-030612 (JP-A-2007-030612) describes a power steering apparatus that improves the steering feel by increasing a damping control amount of EPS when the driver steers while lane keeping assist is being performed.

According to the related art in each of the publications described above, when there is steering input by the driver while lane keeping assist is being performed, it is possible to prevent steering control related to lane keeping assist from interfering with steering control according to a steering input by the driver. However, because the steering control amount itself that is used to perform lane keeping assist is corrected in an attempt to realize a steering intention of the driver, there is a significant decrease in lane keeping assist convergence as a result. Therefore, if the vehicle departs from the target running path due to a disturbance caused by a crosswind or a road gradient during such control, it is not easy to return the vehicle to the target running path. That is, the related art has a technical problem in which the control quality of lane keeping assist, which is critical, declines due to the fact that a steering intention of the driver is unable to be reflected without reducing the convergence of lane keeping assist.

SUMMARY OF INVENTION

In view of the foregoing problems, this invention provides a vehicle control apparatus capable of preventing interference between steering control related to lane keeping assist and steering control that reflects a steering intention of a driver, without reducing the control quality of lane keeping assist.

Thus, a first aspect of the invention relates to a vehicle control apparatus that controls a vehicle provided with a steering force applying device capable of applying steering force to induce a change in a steering angle of a steered wheel to the steered wheel. This vehicle control apparatus includes a difference detecting device that is configured to detect a positional difference that determines a relative positional relationship between a target running path to be maintained and the vehicle; a determining device that is configured to determine a control amount of the steering force applying device in order to maintain a running path of the vehicle on the target running path, based on the detected positional difference; a controller that is configured to maintain the running path on the target running path by controlling the steering force applying device according to the determined control amount; a steering input detecting device that is configured to detect a steering input to a steering input device by a driver; and a correcting device that is configured to correct a determining reference of the control amount such that the detected steering input is reflected, when the steering input is detected while the running path is maintained on the target running path.

As described above, the vehicle related to the invention is provided with a steering force applying device. The steering force applying device is a device that has a physical, mechanical, electrical, or magnetic structure capable of applying steering force that induces a change in a steering angle of the steered wheel (a so-called "actual steering angle"), either directly or indirectly, with respect to the steered wheel (preferably the front wheels or the front and rear wheels). In addition, the steering force applying device is a device capable of controlling the apply characteristic of the steering force by the operation of a controller that will be described later. This steering force applying device is a device in which the change characteristic of the steering angle of the steered wheel is able to be equivocally changed with respect to a steering input applied by the driver via any of a variety of types of steering input devices such as a steering wheel. The steering force applying device preferably has a structure in which various motors or actuators that use power resources supplied from a power storage device such as a battery and are capable of generating this kind of steering force are interposed between the steering input device and the steered wheel.

Some practical forms of such a steering force applying device include, for example, a device that can rotate a steering output shaft that is connected to a steered wheel relative to a steering input shaft that is directly or indirectly connected to a steering input device, such as VGRS, or a device that is physically separated from a steering force applying device, such as SBW. Also, the steering force applying device does not necessarily have to make the steering angle of the steered wheel a control amount. That is, the steering force applying device may also be a type of power steering device such as EPS, that is able to apply steering torque independently of driver steering torque that is one mode of steering input.

The vehicle control apparatus according to the invention is an apparatus that controls a vehicle related to the invention that is provided with such a steering force applying device, and may take the form of, for example, any one of a variety of types of computer systems or the like, such as a variety of types of controllers or microcomputers, or a variety of types of processing units such as one or a plurality of ECUs (Electronic Control Units), that may include one or a plurality of CPUs (Central Processing Units), MPUs (Micro Processing Units), a variety of processors or a variety of controllers, or further, a variety of storage devices such as ROM (Read Only Memory), RAM (Random Access Memory), buffer memory, or flash memory as appropriate.

With the vehicle control apparatus of the invention, the positional difference is detected by operating a difference detecting device when the vehicle control apparatus is operated.

Here, the positional difference is a difference that determines the relative positional relationship between a target running path to be maintained and the vehicle, and is a physical quantity that may become a reference value for making the vehicle travel along the target running path. The positional difference may include a yaw angle difference and/or a difference of a lateral position of the vehicle with respect to the target running path, as one preferable mode.

Incidentally, the target travel path may be a virtual travel path to be traced that is determined by any of a variety of target objects such as a white line or a lane marker, for example, or it may simply be a property formulated in real time by a target position of the vehicle that is set successively on a time line.

When the positional difference is detected, the control amount of the steering force applying device in order to maintain the running path of the vehicle on the target running path is determined by a determining device based on this detected positional difference.

Incidentally, in view of the fact that there is a wide range of practical forms that are able to be taken by the steering force applying device, the determined control amount of the steering force applying device may also take any one of various forms. That is, the control amount may be a steering angle of the steered wheel as a final control target, another rotation angle that induces a change in the steering angle of the steered wheel, or a control amount of a driving device (such as a driving current value or a driving duty ratio) in order to actually change these angles. Also, the control amount of the steering force applying device may be determined in a manner that reflects a way to change the yaw angle or a way to change the lateral acceleration of the vehicle or the like that is determined based on the positional difference.

When the control amount is determined in this way, the steering force applying device is controlled by the controller according to this determined control amount so as to ultimately induce a change in the steering angle of the steered wheel and thus maintain the running path of the vehicle on the target running path. However, the phrase "maintain the running path of the vehicle on the target running path" in this case refers to not only completely matching the running path of the vehicle to the target running path, but also bringing the running path of the vehicle near or to the target running path, as well as continuing to maintain a fixed difference between the running path of the vehicle and the target running path. Incidentally, a running state in which the running path is maintained on the target running path will hereinafter simply be referred to as a state in which lane keeping assist is performed when appropriate.

Meanwhile, one preferable configuration of the vehicle enables the driver to freely operate a steering input device based on his or her, own steering intention, even while such lane keeping assist is being performed.

Here, it is both common sense and preferable to have this type of lane keeping assist be quickly canceled when there is a relatively large steering input, such as when the driver wishes to change lanes. However, in a case such as when the driver intends to maintain a running path that is still within the lane but is off somewhat from the target running path, lane keeping assist needs to be continued even if there is a steering input by the driver.

However, when lane keeping assist is continued, the determining device and the controller consistently attempt to make the vehicle follow the target running path, so even if an override operation of the steering input device is performed based on an intention of the driver him or herself, the change in the steering angle of the steered wheel that corresponds to that override operation will, at least qualitatively, be canceled out by control logic for continuing lane keeping assist. That is, the control logic related to lane keeping assist may interfere with the override operation, which may make it difficult for the intention of the driver to be reflected in the behavior of the vehicle.

Of course, if the internal logic of the control amount determining process of the steering force applying device based on the positional difference is changed, e.g., if an elemental value that formulates the feedback control itself such as the feedback gain of the lateral difference or the feedback gain of the yaw angle difference is changed, in order to avoid this kind of control interference, a positional difference due to a disturbance element other than the override operation, such as a crosswind or a road gradient or the like, will similarly be allowed to as a trade-off for the override operation by the driver being easily reflected in the steering angle change. That is, if such a step is taken, the convergence accuracy of the control related to lane keeping assist will decrease significantly, so the control quality of lane keeping assist itself will deteriorate.

Therefore, the vehicle control apparatus of the invention is able to accurately reflect an override intention of the driver while maintaining the control quality of lane keeping assist as described below.

That is, with the vehicle control apparatus of the invention, a steering input by the driver is detected by the steering input detecting device when the vehicle control apparatus is operating. Here, it is sufficient that the steering input detecting device have a structure capable of at least detecting whether there is a steering input that is based on a steering intention of the driver. More preferably, the steering input detecting device is configured to be able to detect the degree of that steering input. Detection of the steering input is basically able to be realized by a step such as monitoring the sensor output of a steering angle sensor or the like, for example. However, when lane keeping assist is being performed, the operation amount of the steering input device may not always be zero, so when detecting whether there is a steering input, it is preferable that any effect of the steering angle of the steering input device needed to implement lane keeping assist be eliminated.

More specifically, if the steering angle of the steering input device is A° and the steering angle of the steering input device for performing lane keeping assist is B°, then the steering angle (i.e., the steering input) corresponding to an override operation by the driver can be considered to be (A−B)°. At this time, the steering input is preferably compared with a predetermined threshold value in order to eliminate the effects of minute vibration and the like that occurs naturally, and habits of the driver.

On the other hand, the vehicle control apparatus of the invention is configured such that a determining reference of the control amount is corrected by a correcting device when a steering input has been detected by the steering input detecting device while the running path is being maintained on the target running path.

Here, the determining reference of the control amount of the invention is a condition that is a condition or basis of a control amount determination and does not affect the control logic that is applied when the controller determines the control amount. One preferable mode is an input value or an output value or the like of the control logic. The positional difference, for example, is suitable as this input value, and the control amount itself, for example, is suitable as the output value.

If this determining reference of the control amount is corrected in this way, a steering intention of the driver will be reflected in the final steering angle change amount or the convergence target of the control related to lane keeping assist, so the convergence accuracy itself with respect to the convergence target is essentially unaffected. Therefore, vehicle behavior with respect to a disturbance from a crosswind or a road gradient or the like can be quickly restored. Meanwhile, when there is an override operation that is based on an intention of the driver him or herself, this override operation can be reliably reflected in the change in behavior of the vehicle. That is, interference between the steering control related to lane keeping assist and steering control that reflects a steering intention of the driver can be prevented without reducing the control quality of lane keeping assist.

Also, in the vehicle control apparatus described above, the steering force applying device may include a variable steering angle device capable of changing a relationship between a steering angle of the steering input device and the steering angle of the steered wheel, and the controller may change the steering angle of the steered wheel independently of a steering input by the driver via the variable steering angle device.

According to this vehicle control apparatus, the steering force applying device of the invention includes a variable steering angle device capable of changing the relationship between the steering angle of the steering input device and the steering angle of the steered wheel, such as VGRS or SBW or the like. Also, when performing lane keeping assist on the vehicle 10, the controller steers the steered wheel independently of a steering input by the driver, by controlling this variable steering angle device.

Therefore, according to this structure, lane keeping assist according to one type of automatic steering that is referred to as so-called hands-free driving is also possible, so the steering load on the driver is able to be suitably reduced. Also, with this type of variable steering angle device, the control amount is a value corresponding to the steering angle of the steered wheel, so the practical benefits of the invention, i.e., relatively high control accuracy of the vehicle behavior, and preventing interference between steering control related to lane keeping assist and steering control that reflects a steering intention of the driver without reducing the control quality of lane keeping assist, are able to be reliably obtained.

Also, in the vehicle control apparatus described above, the determining reference may be a condition that determines the positional difference.

According to this vehicle control apparatus, various conditions that determine the positional difference as the determining reference are corrected. The positional difference corresponds to an input value, as it were, of logic control related to lane keeping assist, and does not at all affect the convergence of the control related to lane keeping assist because it has absolutely no relation to the various feedback gains that formulate the control logic itself. Therefore, a steering intention of the driver is able to be accurately reflected in a change in the steering angle of the steered wheel without reducing the control quality of lane keeping assist.

Also, in the vehicle control apparatus described above, the condition that determines the positional difference may be the target running path, and the correcting device may shift the target running path toward a steering direction that is determined by the detected steering input.

According to this vehicle control apparatus, the target running path itself as the condition that determines the positional difference is corrected, such that the target running path shifts in the direction in which the driver is steering. For example, if the driver wants to maintain a running path that is off to the right (or left) of the original target running path while lane keeping assist is being performed, the target running path is shifted to the right (or left). Reflecting the steering intention of the driver in the target running path itself in this way makes it possible to suitably reflect a steering intention of the driver without affecting the convergence speed or convergence accuracy related to following the target running path.

Also, in the vehicle control apparatus described above, the condition that determines the positional difference may be an allowable range of the positional difference, and the correcting device may expand the allowable range when the steering input is detected compared with when the steering input is not detected.

According to this vehicle control apparatus, the allowable range of the positional difference between the target running path and the vehicle, as a condition that determines the positional difference, is corrected. Here, the allowable range is a range of offset that is allowed for the target running path. For example, if the driver wants to maintain a running path that is offset to the right (or left) of the original target running path while lane keeping assist is being performed, an offset to the right (or left) with respect to the target running path is allowed, and the positional difference is decreased by this allowed amount in the process related to the control amount determination, for example. Therefore, even if the target running path does not change, there is seemingly no positional difference, so it is possible to prevent a situation in which a change in the steering angle of the steered wheel from an override operation by the driver is interfered with by control logic related to lane keeping assist.

Also, in the vehicle control apparatus described above, the steering input detecting device may be capable of detecting a degree of the steering input, and the correcting device may increase a correction amount of the determining reference as the detected steering input increases.

According to this vehicle control apparatus, the correction amount of the determining reference increases as the degree of the steering input increases, so lane keeping assist that more accurately reflects a steering intention of the driver is possible.

Also, in the vehicle control apparatus described above, the correcting device may change a correction amount of the determining reference according to a running condition of the vehicle.

For example, when the speed of the vehicle (i.e., the vehicle speed) as the running condition changes, the behavior of the vehicle with respect to a given steering angle of the steered wheel changes. Therefore, when the correction amount of the determining reference related to the control amount, or more specifically, the allowed amount of the positional difference or the like, is set uniformly with respect to the vehicle speed, a change in the steering angle of the steered wheel due to an override operation may be insufficient or, conversely, excessive. In either case, it may lead to a steering intention of the driver not being sufficiently reflected.

Also, if the curvature (or the curve radius) of the target running path, for example, is taken as the running condition and the target running path is straight or substantially straight (i.e., with a small curvature and large radius), the difference of the lateral position tends to change more easily than the yaw angle difference, as the positional difference, and the effect of the yaw angle difference on the vehicle behavior increases (i.e., because the running path is straight, the yaw angle difference should basically not change that much). On the other hand, if the target running path is curved (i.e., with a large curvature and small radius), the yaw angle difference tends to change more easily than the difference in the lateral position, as the positional difference, and the effect of the difference of the lateral position on the vehicle behavior increases.

According to this vehicle control apparatus, the correction amount of the determining reference changes according to the running condition of the vehicle, so a steering intention of the driver can be accurately reflected, and the followability or convergence with lane keeping assist can be more reliably ensured.

Furthermore, in the vehicle control apparatus described above, the correcting device may correct the determining reference within a predetermined limited range that is determined by an upper limit value.

According to this vehicle control apparatus, the determining reference related to the control amount determination is corrected within a predetermined limited range. As a result, a fixed limitation can be applied to an excessive override operation by the driver, so a case in which lane keeping assist is significantly disturbed as a result of the intention of the driver being reflected can be prevented. This kind of limited range may be set such that the target running path will not depart from the existing lane when the correction target is the target running path, or preliminarily set such that the lateral acceleration of the vehicle induced by a change in the steering angle of the steered wheel that is caused by an override operation being reflected will not fall outside of a control range for lane keeping assist.

These kinds of operations and other advantages of the invention will now be clarified through example embodiments that will be described next.

BRIEF DESCRIPTION OF DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Hereinafter, example embodiments of the vehicle control apparatus of the invention will be described with reference to the accompanying drawings.

First, the structure of a vehicle 10 according to a first example embodiment of the invention will be described with reference to FIG. 1. Here, FIG. 1 is a schematic diagram conceptually showing the basic structure of the vehicle 10.

Figure 1:
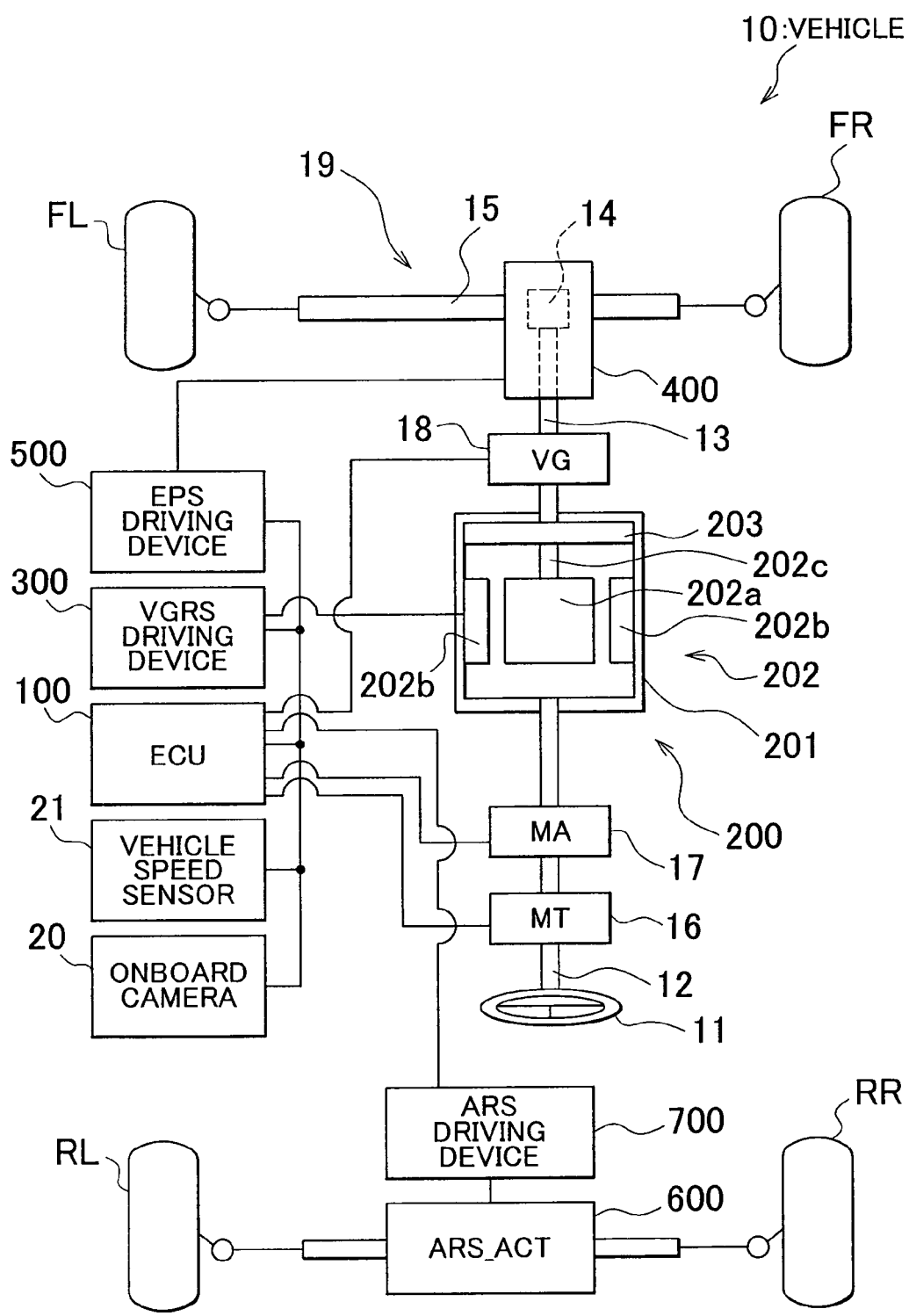
FIG. 1 is a schematic diagram conceptually showing the structure of a vehicle according to a first example embodiment of the invention.

In FIG. 1, the vehicle 10 includes, as the steered wheels, a pair of right and left front wheels FL and FR and a pair of left and right rear wheels RL and RR. The vehicle 10 is structured so as to be able to advance in a desired direction by steering these steered wheels in a steering direction. The vehicle 10 also includes an ECU 100, a VGRS actuator 200, a VGRS driving device 300, an EPS actuator 400, an EPS driving device 500, an ARS actuator 600, and an ARS driving device 700.

The ECU 100 is an electronic control unit that includes a CPU (Central Processing Unit), ROM (Read Only Memory), and RAM (Random Access Memory), none of which are shown, and is configured to be able to control the overall operation of the vehicle 10. The ECU 100 is one example of the vehicle control apparatus of the invention. The ECU 100 is configured to be able to execute LKA control, EPS control, and VGRS control, all of which will be described later, according to control programs stored in the ROM.

Incidentally, the ECU 100 is an integrated electronic control unit configured to function as an example of each of the difference detecting device, the determining device, the controller, the steering input detecting device, and the correcting apparatus of the invention. The ECU 100 is configured to execute operations related to each of these devices. However, the physical, mechanical, and electrical structures of these devices of the invention are not limited to this. For example, these devices may be structured as various computer systems or the like, such as a plurality of ECUs, various processing units, various controllers, or microcomputers.

In the vehicle 10, a steering input by the driver via a steering wheel 11 as the steering input device is transmitted to an upper steering shaft 12 as a shaft that is connected to the steering wheel 11 so as to be able to rotate about the same axis and that rotates in the same direction as the steering wheel 11. The upper steering shaft 12 is connected at a downstream end portion thereof to the VGRS actuator 200.

The VGRS actuator 200 is an example of the steering force applying device of the invention and includes a housing 201, a VGRS motor 202, and a reduction mechanism 203.

The housing 201 serves as the case of the VGRS actuator 200 and houses the VGRS motor 202 and the reduction mechanism 203. The downstream end portion of the upper steering shaft 12 described above is fixed to the housing 201, and the housing 201 is able to rotate together with the upper steering shaft 12.

The VGRS motor 202 is a DC brushless motor that has a rotor 202a, a stator 202b, and a rotating shaft 202c that serves as an output shaft for driving force. The stator 202b is fixed to the inside of the housing 201, and the rotor 202a is rotatably retained inside the housing 201. The rotating shaft 202c is fixed to the rotor 202a so that is can rotate about the same axis. A downstream end portion of the rotating shaft 202c is coupled to the reduction mechanism 203.

The reduction mechanism 203 is a planetary gear set that has a plurality of rotating elements (i.e., a sun gear, a carrier, and a ring gear) in which differential rotation there among is possible. Of the plurality of rotating elements, the sun gear that serves as a first rotating element is coupled to the rotating shaft 202c of the VGRS motor 202, and the carrier that serves as a second rotating element is coupled to the housing 201. The ring gear that serves as a third rotating element is coupled to a lower steering shaft 13.

With the reduction mechanism 203 having this kind of structure, the rotation speed of the lower steering shaft 13 that is coupled to the ring gear that serves as the remaining rotating element is primarily determined by the rotation speed of the upper steering shaft 12 according to the operation amount of the steering wheel (i.e., the rotation speed of the housing 201 that is coupled to the carrier), and the rotation speed of the VGRS motor 202 (i.e., the rotation speed of the rotating shaft 202c that is coupled to the sun gear). At this time, the rotation speed of the lower steering shaft 13 can be controlled (i.e., increased or decreased) by controlling (i.e., increasing or decreasing) the rotation speed of the VGRS motor 202 by the differential operation among the rotating elements. That is, the upper steering shaft 12 and the lower steering shaft 13 are able to rotate relative one another by the operation of the reduction mechanism 203 and the VGRS motor 202. Also, in the structure of the rotating elements of the reduction mechanism 203, the rotation speed of the VGRS motor 202 is transmitted to the lower steering shaft 13 in a decelerated state according to a predetermined reduction gear ratio that is determined according to the gear ratios among the rotating elements.

In this way, with the vehicle 10, a steering transfer ratio K1, that is the ratio of a steering angle MA that is the rotation amount of the upper steering shaft 12 to a steering angle θf of a front wheel as one of the steered wheels (the gear ratio of a rack and pinion mechanism that will be described later is also related) that is primarily determined according to the rotation amount of the lower steering shaft 13, is able to be continuously changed within a predetermined range.

That is, the VGRS actuator 200 is also able to function as an example of the variable steering angle device of the invention, that is able change the relationship between the steering angle MA and the steering angle θf, and is also able to change the steering angle θf of the front wheels irrespective of a steering input by the driver.

Incidentally, the reduction mechanism 203 is not limited to the planetary gear set described here, but may take another form (for example, the upper steering shaft 12 and the lower steering shaft 13 may be provided with a flexible gear in which one number of teeth are provided on the upper steering shaft 12 and a different number of teeth are provided on the lower steering shaft 13 and only some of the teeth on the upper steering shaft 12 are in contact with only some of the teeth on the lower steering shaft 13, and the upper steering shaft 12 and the lower steering shaft 13 may be made to rotate relative one another by rotating the flexible gear by motor torque transmitted via an undulation generator). Alternatively, the reduction mechanism 203 may be a planetary gear unit but one that takes a physical, mechanical, or mechanistic form different from that described above.

The VGRS driving device 300 is an electronic drive circuit that includes a PWM circuit, a transistor circuit, and an inverter and the like, and is configured to energize the stator 202b of the VGRS motor 202. The VGRS driving device 300 is electrically connected to a battery, not shown, and is configured to be able to supply driving voltage to the VGRS motor 202 by power supplied from the battery. Also, the VGRS driving device 300 is electrically connected to the ECU 100 and is configured so that its operation is controlled by the ECU 100. Incidentally, the VGRS driving device 300, together with the VGRS actuator 200, forms one example of the steering force applying device of the invention.

The rotation of the lower steering shaft 13 is transmitted to a steering mechanism 19. The steering mechanism 19 is a so-called rack-and-pinion mechanism that includes a pinion 14 that is connected to a downstream end portion of the lower steering shaft 13, and a rack bar 15 on which is formed gear teeth that mesh with gear teeth on the pinion 14. This steering mechanism 19 is structured such that steering force is transmitted to each steered wheel, via a tie-rod and a knuckle (not indicated by reference characters) that are connected to each end portion of the rack bar 15, by rotation of the pinion 14 being converted into movement of the rack bar 15 in the left-right direction in the drawing.

The EPS actuator 400 is provided with an EPS motor as a DC brushless motor that includes a rotor, not shown, in which permanent magnets are embedded, and a stator that surrounds the rotor. This EPS actuator 400 is one example of the steering force applying device of the invention. The EPS motor is structured to be able to generate assist torque TA in the rotational direction of the rotor by the rotor rotating as a result of the action of a rotating magnetic field generated inside the EPS motor when the stator is energized by the EPS driving device 500.

Meanwhile, a reduction gear, not shown, is fixed to a motor shaft that is a rotating shaft of the EPS motor. This reduction gear is also in mesh with the pinion 14. Therefore, the assist torque TA generated by the EPS motor functions as assist torque that assists with the rotation of the pinion 14. The pinion 14 is coupled to the lower steering shaft 13 as described above, and the lower steering shaft 13 is coupled to the upper steering shaft 12 via the VGRS actuator 200. Therefore, driver steering torque MT that is applied to the upper steering shaft 12 is transmitted to the rack bar 15 while being assisted as appropriate by the assist torque TA, thus reducing the steering load on the driver.

The EPS driving device 500 is an electric drive circuit that is configured so as to be able to energize the stator of the EPS motor, and includes a PWM circuit, a transistor circuit, and an inverter and the like. The EPS driving device 500 is electrically connected to a battery, not shown, and is thus able to supply driving voltage to the EPS motor by power supplied from the battery. The EPS driving device 500 is also electrically connected to the ECU 100, and the operation of the EPS driving device 500 is controlled by the ECU 100. Incidentally, the EPS driving device 500, together with the EPS actuator 400, is one example of the steering force applying device of the invention.

Incidentally, the mode of the steering force applying device of the invention is not limited to the examples described here. For example, the assist torque TA that is output from the EPS motor may also be directly transmitted to the lower steering shaft 13 with a reduction of rotation speed by a reduction gear, not shown, or it may be applied as force to assist with the reciprocating motion of the rack bar 15. That is, the specific structure of the steering force applying device of the invention is not particularly limited as long as the assist torque TA that is output from the EPS motor is ultimately able to be supplied as at least a portion of the steering force that steers the steered wheels.

Meanwhile, the vehicle 10 is provided with various sensors, including a steering torque sensor 16, a steering angle sensor 17, and a rotation sensor 18.

The steering torque sensor 16 is a sensor that is configured to be able to detect driver steering torque MT applied by the driver via the steering wheel 11. More specifically, the upper steering shaft 12 is divided into an upstream portion and a downstream portion that are connected together by a torsion bar, not shown. Rings for detecting a rotational phase difference are fixed to the both the upstream and downstream end portions of this torsion bar. This torsion bar is designed to twist in the rotational direction according to steering torque (i.e., driver steering torque MT) that is transmitted via the upstream portion of the upper steering shaft 12 when the driver of the vehicle 10 turns the steering wheel 11, and enable steering torque to be transmitted while it is being twisted. Thus, when steering torque is transmitted, a rotational phase difference occurs between the phases of the rotational phase difference detecting rings described above. The steering torque sensor 16 is configured to be able to detect this rotational phase difference, convert the rotational phase difference into steering torque, and output an electric signal indicative of the steering torque MT. The steering torque sensor 16 is also electrically connected to the ECU 100, and the detected steering torque MT is referenced regularly or irregularly by the ECU 100.

The steering angle sensor 17 is an angle sensor that is configured to be able to detect a steering angle MA indicative of the rotation amount of the upper steering shaft 12. The steering angle sensor 17 is electrically connected to the ECU 100, and the detected steering angle MA is referenced regularly or irregularly by the ECU 100.

The rotation sensor 18 is a rotary encoder that is configured to be able to detect a rotational phase difference $\Delta\theta$ between the housing 201 of the VGRS actuator 200 (which is equivalent to the upper steering shaft 12 in terms of rotation angle) and the lower steering shaft 13. The rotation sensor 18 is electrically connected to the ECU 100, and the detected rotational phase difference $\Delta\theta$ is referenced regularly or irregularly by the ECU 100.

An onboard camera 20 is an imaging device that is arranged at the front nose of the vehicle 10 and configured to be able to capture an image of a predetermined area in front of the vehicle 10. The onboard camera 20 is electrically connected to the ECU 100, and the captured image of the front area is regularly or irregularly sent to the ECU 100 as image data. The ECU 100 is then able to analyze this image data and obtain various data necessary for LKA control that will be described later.

A vehicle speed sensor 21 is a sensor that is configured to be able to detect a vehicle speed V, i.e., the speed of the vehicle 10. The vehicle speed sensor 21 is electrically connected to the ECU 100, and the detected vehicle speed V is referenced regularly or irregularly by the ECU 100.

The ARS actuator 600 includes a power cylinder, not shown, and an ARS motor that applies reciprocating driving force to the power cylinder in the left and right directions in the drawing. The ARS actuator 600 that is yet another example of the steering force applying device of the invention is able to change a steering angle $\theta r$ of the rear wheels that are steered wheels by driving rear steering rods (not indicated by reference characters) that are connected to both ends of the power cylinder a predetermined amount in the left and right directions using driving force applied by this motor.

Incidentally, the ARS actuator 600 is a device that is not mechanically connected to the upper steering shaft 12 that serves as the steering input device, but is able to change the rear wheel steering angle Or independently of a steering input by the driver, according to an electric signal. Also, the relationship between the steering angle MA and the rear wheel steering angle $\theta r$ is of course not primarily specified. That is, the ARS actuator 600 is one type of SBW system and is another example of the variable steering angle device of the invention.

The ARS driving device 700 is an electric drive circuit that is configured to be able to energize the ARS motor and includes a PWM circuit, a transistor circuit, and an inverter and the like. The ARS driving device 700 is electrically connected to a battery, not shown, and is thus able to supply driving voltage to the ARS motor by power supplied from the battery. Also, the ARS driving device 700 is also electrically connected to the ECU 100, and the operation of the ARS driving device 700 is controlled by the ECU 100.

Incidentally, the ARS driving device 700, together with the ARS actuator 600, is one example of the steering force applying device of the invention. In this way, the vehicle 10 in this example embodiment has a steering mode that is referred to as so-called four-wheel steering. However, a vehicle structure that enables the rear wheels to be steered is not limited to that shown in the drawings. To the contrary, any one of a variety of known modes may be used.

Hereinafter, the operation of this example embodiment will be described with reference to the drawings when appropriate.

First, LKA control that is executed by the ECU 100 will be described in detail with reference to FIG. 2 that is a flowchart of LKA control. Incidentally, LKA control is control that directs the vehicle 10 to follow a target travel path (i.e., a lane in this example embodiment), and is one type of driving assist control in the vehicle 10.

Figure 2:
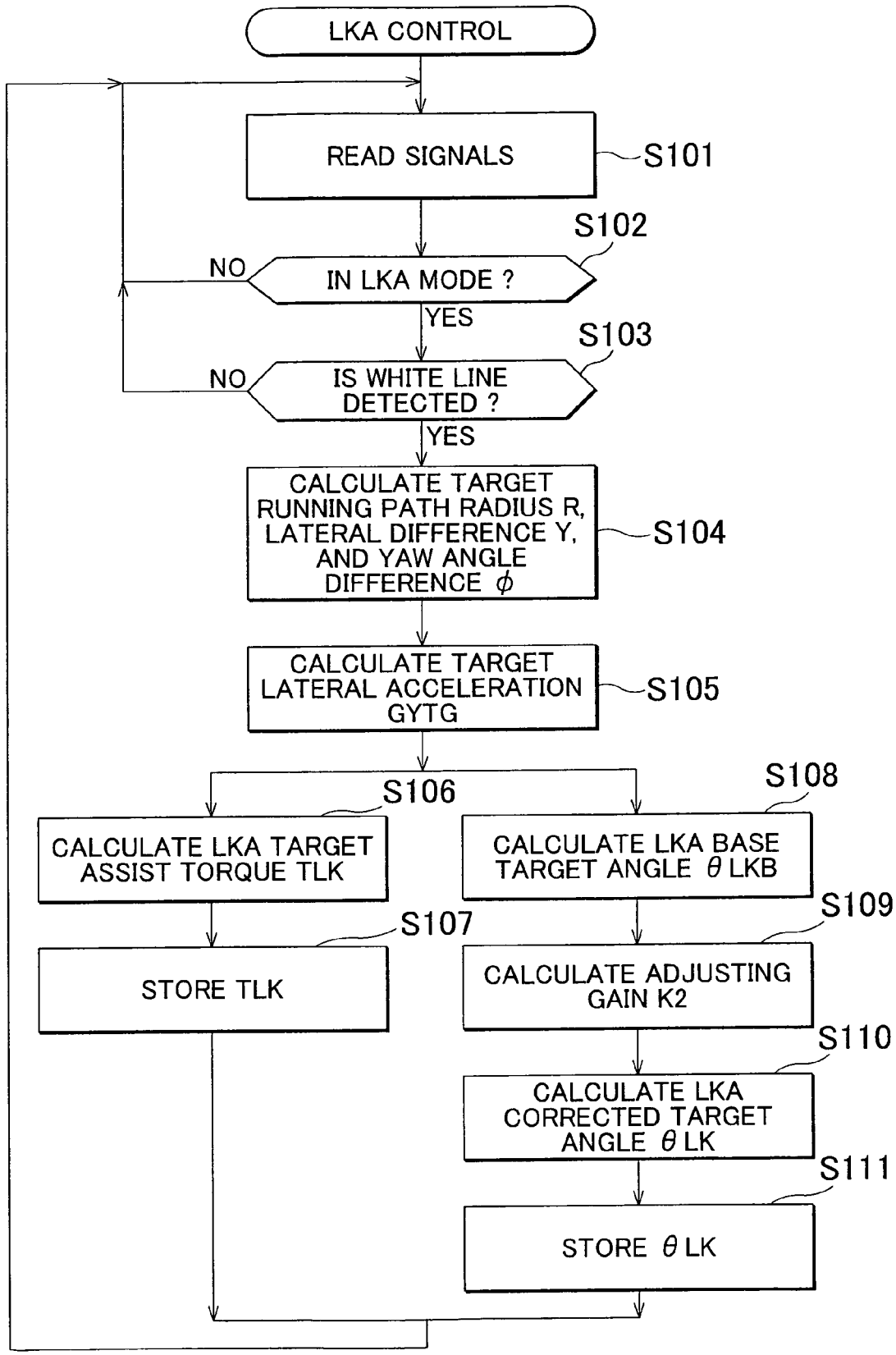
FIG. 2 is a flowchart of LKA control performed in the vehicle in FIG. 1, according to the first example embodiment.

In FIG. 2, the ECU 100 reads various signals, including various flags and operation signals from various switches provided in the vehicle 10 and various sensor signals related to the various sensors described above (step S101), and determines whether an LKA mode is selected as a result of an LKA control-starting button that is arranged inside the cabin of the vehicle 10 beforehand being operated by the driver (step S102). If the LKA mode is not selected (i.e., NO in step S102), the ECU 100 returns the process to step S101.

If, on the other hand, the LKA mode is selected (i.e., YES in step S102), the ECU 100 determines whether a white line (the line does not have to be white) that defines the target running path of LKA is detected, based on the image data sent from the onboard camera 20 (step S103). If a white line is not detected (i.e., NO in step S103), a virtual target running path cannot be set, so the ECU 100 returns the process to step S101. If, on the other hand, a white line is detected (i.e., YES in step S103), the ECU 100 calculates various road information necessary when directing the vehicle 10 to follow the target running path (step S104).

In step S104, a radius R (i.e., the reciprocal of the curvature) of the target running path, a lateral difference Y that is the difference between the white line and the vehicle 10 in the lateral direction, and a yaw angle difference $\phi$ between the white line and the vehicle 10 are calculated. Here, the lateral difference Y and the yaw angle difference $\phi$ calculated in step S104 are each examples of the positional difference of the invention. When these are calculated in step S104, a calculation process that takes an override operation of the steering wheel 11 by the driver into account is applied. This calculation process that takes this override operation into account will be described later. Incidentally, a known image analysis algorithm that is based on the image data can be applied to calculate the radius R of the target running path (hereinafter referred to as the "running path radius R" when appropriate), but that calculation process itself is not greatly related to the invention so a detailed description thereof will be omitted here.

When the various road information is calculated, the ECU 100 calculates a target lateral acceleration GYTG that is necessary for directing the vehicle 10 to follow the target running path (step S105). Incidentally, the target lateral acceleration GYTG can also be calculated according to any one of a variety of known algorithms or operational expressions. Alternatively, a target lateral acceleration map that has the running path radius R, the lateral difference Y, and the yaw angle difference $\phi$ as parameters may be stored in advance in an appropriate storage device such as ROM, and the ECU 100 may calculate the target lateral acceleration GYTG by selecting an appropriate corresponding value (this type of selection is also one calculation mode).

Incidentally, in addition, the ECU 100 multiplies the calculated radius R by a feedback gain Kr, multiplies the lateral difference Y by a feedback gain Ky, and multiplies the yaw angle difference $\phi$ by a feedback gain K$\phi$, and then calculates the target lateral acceleration GYTG by adding these feedback control terms. Qualitatively, the target lateral acceleration GYTG becomes greater as the running path radius R becomes smaller, the lateral difference Y becomes larger, and the yaw angle difference $\phi$ becomes larger.

When the target lateral acceleration GYTG is calculated, the process divides into two. That is, in one process, the ECU 100 calculates an LKA target assist torque TLK (step S106) and stores the calculated LKA target assist torque TLK in an appropriate rewritable storage device such as flash memory or RAM (step S107). The LKA target assist torque TLK is specified in an LKA target assist torque map that is stored beforehand in ROM and has the target lateral acceleration GYTG and the vehicle speed V as parameters. The ECU 100 calculates the LKA target assist torque TLK by selecting a corresponding numerical value from the map.

Also, in the other process, the ECU 100 calculates an LKA base target angle θLKB based on the target lateral acceleration GYTG (step S108), and then calculates an adjusting gain K2 based on the running path radius R (step S109). Furthermore, the ECU 100 calculates an LKA corrected target angle θLK according to Expression (1) below (step S110). Once the LKA corrected target angle θLK is calculated, the ECU 100 stores this calculated LKA corrected target angle θLK in a storage device such as RAM or flash memory (step S111).

$$\theta LK = \theta LKB \times K2 \quad (1)$$

Figure 3:
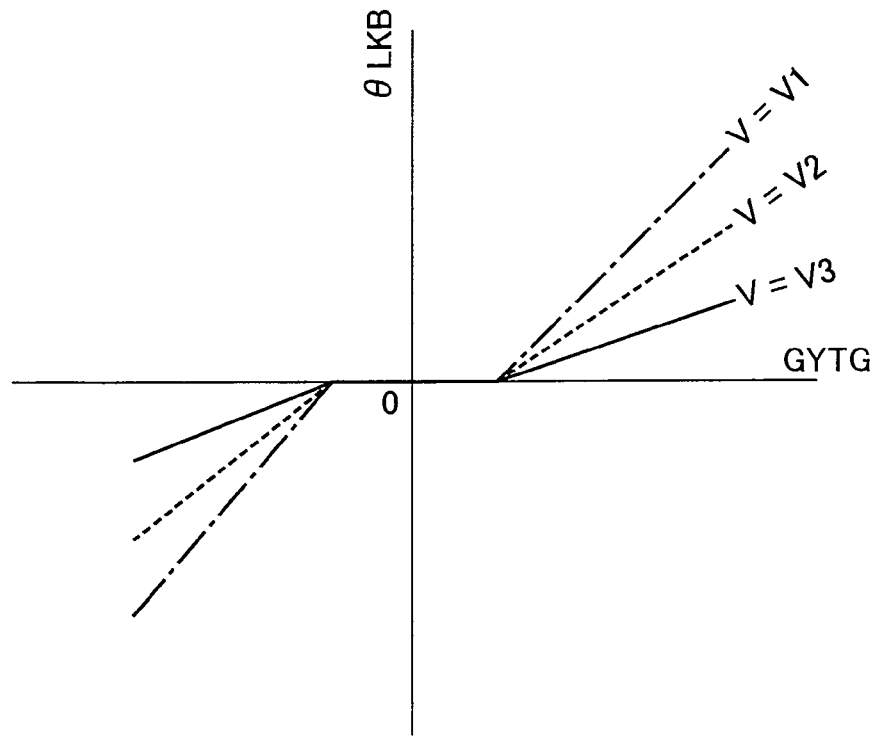
FIG. 3 is a view showing a frame format of the relationship between a target lateral acceleration and a LKA base target angle, according to the first example embodiment.

Here, the relationship between the target lateral acceleration GYTG and the LKA base target angle θLKB will be described with reference to FIG. 3. FIG. 3 is a view showing a frame format of the relationship between the target lateral acceleration GYTG and the LKA base target angle θLKB.

In FIG. 3, the vertical axis represents the LKA base target angle θLKB and the horizontal axis represents the target lateral acceleration GYTG. Here, the region to the left of a zero line that corresponds to a target lateral acceleration GYTG of 0 indicates a target lateral acceleration toward the left of the vehicle, and the region to the right of this zero line indicates a target lateral acceleration toward the right of the vehicle. Also, the region above a zero line that corresponds to a LKA base target angle θLKB of 0 corresponds to a steering angle of the steered wheels toward the right of the vehicle, and the region below this zero line corresponds to a steering angle of the steered wheels toward the left of the vehicle. Accordingly, the LKA base target angle θLKB is symmetrical across the zero line. The LKA base target angle θLKB has a characteristic in which, with the exception of an undetectable area near a target lateral acceleration GYTG of 0, the absolute value is linearly added to the target lateral acceleration GYTG.

Meanwhile, in FIG. 3, the characteristic of the LKA base target angle θLKB with respect to three different vehicle speeds V, i.e., vehicle speed V=V1, V2 (V2>V1), and V3 (V3>V2), is indicated by the alternate long and short dash line, the broken line, and the solid line, respectively, in the drawing. As is evident from the drawing, the LKA base target angle θLKB is set lower as the vehicle speed V increases. This is because the degree to which lateral acceleration is generated with respect to the steering angle of the steered wheels increases as the vehicle speed V increases. Incidentally, an LKA base target angle map in which the relationship shown in FIG. 3 is digitalized is stored in the ROM of the ECU 100 beforehand (of course the vehicle speed V as a parameter value is more detailed), and a corresponding value is selected from this LKA base target angle map in step S108.

Figure 4:
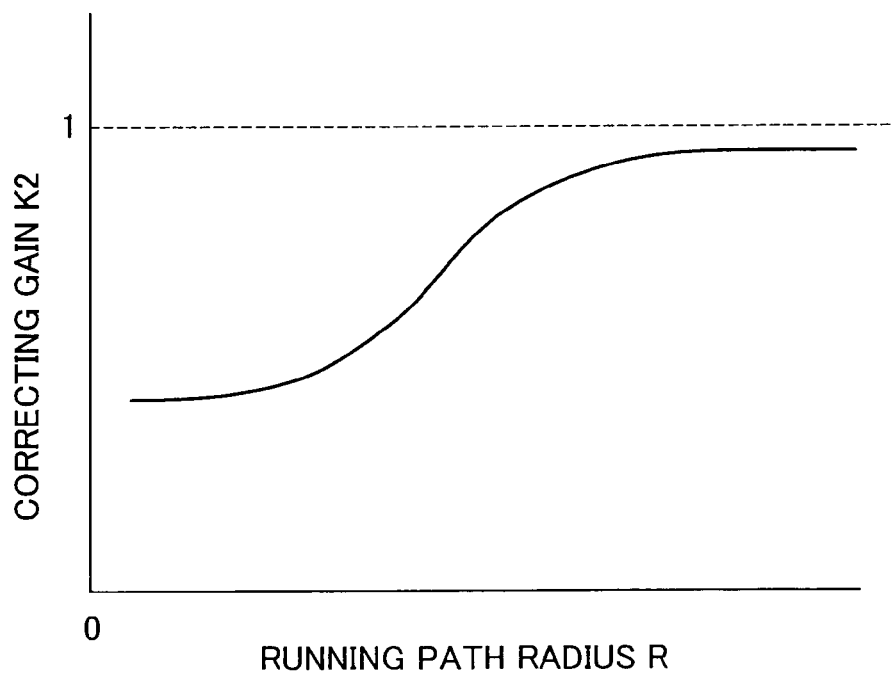
FIG. 4 is a view showing a frame format of the relationship between a running path radius and an adjusting gain, according to the first example embodiment.

Here, the relationship between the curvature R and the adjusting gain K2 will be described with reference to FIG. 4. FIG. 4 is a view showing a frame format of the relationship between the running path radius R and the adjusting gain K2.

In FIG. 4, the vertical axis represents the adjusting gain K2 and the horizontal axis represents the radius R of the target running path. That is, the target running path curves sharply (i.e., is a sharp curve) farther toward the left in the drawing, and the target running path approaches a straight line farther toward the right. As shown in the drawing, the adjusting gain K2 is set in a region less than 1, and so as to approach 1 as the radius R of the running path increases (i.e., approaches a straight line). This is because more turning of the steering wheel 11 is allowed with a smaller running path radius (i.e., the driver feels no discomfort).

Incidentally, an adjusting gain map in which the relationship shown in FIG. 4 is digitalized is stored in the ROM of the ECU 100 beforehand, and a corresponding value is selected from this adjusting gain map in step S109.

Returning to FIG. 2, once the LKA target assist torque TLK and the LKA corrected target angle θLK are stored in steps S107 and S111, respectively, the process returns to step S101.

Meanwhile, the actual operation to have the vehicle 10 follow the target running path is realized by EPS control. EPS control will now be described in detail with reference to FIG. 5 that is a flowchart of EPS control. Incidentally, portions of FIG. 5 that overlap with portions in FIG. 2 will be denoted by the same reference characters and descriptions of those portions will be omitted as appropriate.

Figure 5:
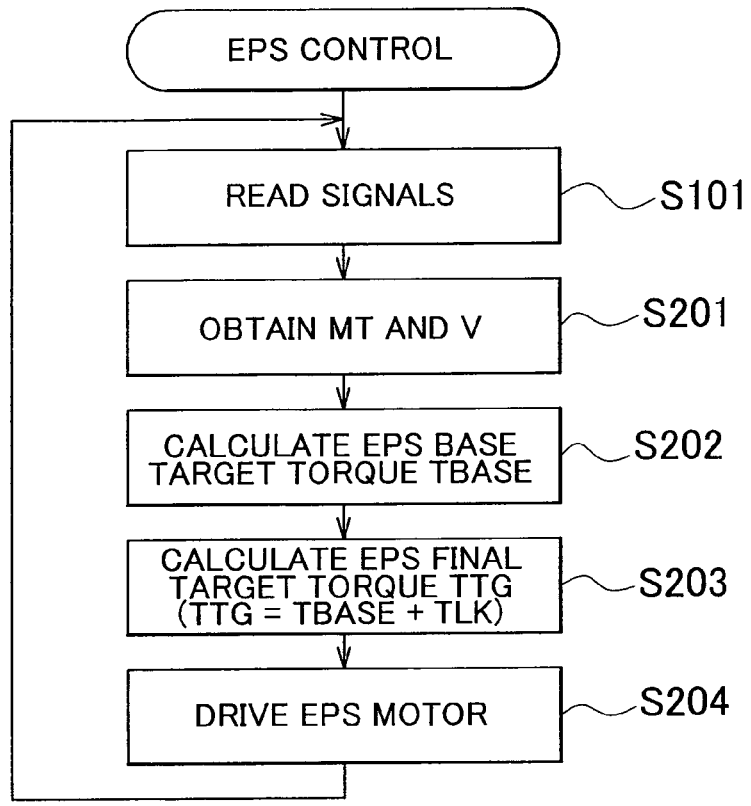
FIG. 5 is a flowchart of EPS control according to the first example embodiment.

In FIG. 5, the ECU 100 first reads various signals (step S101) and obtains the driver steering torque MT and the vehicle speed V (step S201). Then the ECU 100 calculates an EPS base target torque TBASE that is a base value of an assist torque TA to be output from the EPS motor of the EPS actuator 400, based on the obtained driver steering torque MT and the vehicle speed V (step S202).

Figure 6:
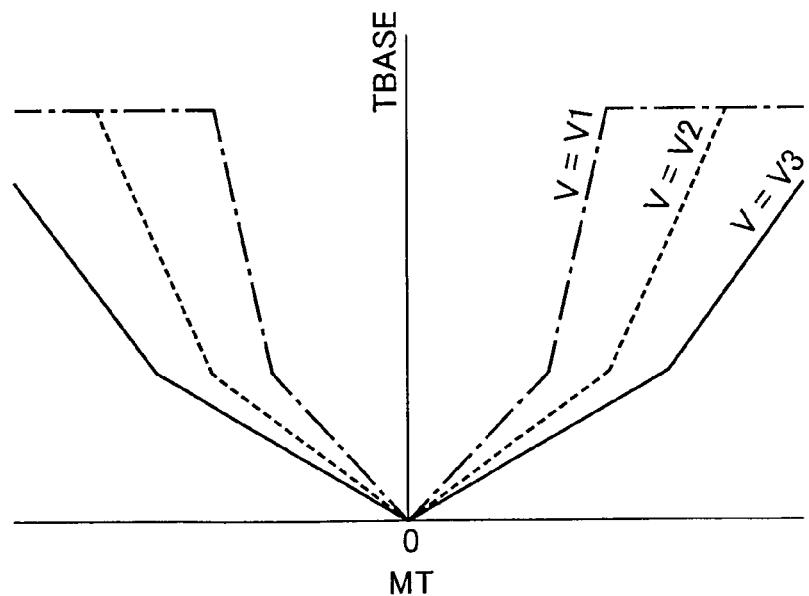
FIG. 6 is a view showing a frame format of the relationship between an EPS base target torque and a driver steering torque.

Here, the relationship between the EPS base target torque TBASE and the driver steering torque MT will be described with reference to FIG. 6. FIG. 6 is a view showing a frame format of the relationship between the EPS base target torque TBASE and the driver steering torque MT.

In FIG. 6, the vertical axis represents the EPS base target torque TBASE and the horizontal axis represents the driver steering torque MT. Incidentally, the region to the left of a zero line that corresponds to a driver steering torque MT of 0 corresponds to a steering operation of the steering wheel 11 to the left side of the vehicle, and the region to the right of this zero line corresponds to a steering operation of the steering wheel 11 to the right side of the vehicle. Accordingly, the EPS base target torque TBASE is symmetrical across the zero line in the drawing.

Also, a negative value is not used for the EPS base target torque TBASE. If a negative value was used for the EPS base target torque TBASE, it would mean that inverse assist as it were in a direction opposite the steering direction of the steering wheel 11 would be performed. In this example embodiment, in order to improve behavior stability of the vehicle 10, the EPS base target torque TBASE is determined so that the EPS actuator 400 will not be placed in an inverse assist state.

Meanwhile, in FIG. 6, the characteristic of the EPS base target torque TBASE with respect to three different vehicle speeds V, i.e., vehicle speed V=V1, V2 (V2>V1), and V3 (V3>V2), is indicated by the alternate long and short dash line, the broken line, and the solid line, respectively, in the drawing. As is evident from the drawing, the EPS base target torque TBASE is set lower as the vehicle speed V increases. This is because the steering angle of the steered wheels to obtain the necessary lateral acceleration decreases as the vehicle speed V increases. Increasing the force required to turn the steering wheel 11 (i.e., making the steering wheel "heavy") at high vehicle speeds prevents an excessive operation (such as oversteering) by the driver, and thus improves the stability of the behavior of the vehicle 10. Incidentally, an EPS base target torque map in which the relationship shown in FIG. 6 is digitalized is stored in the ROM of the ECU 100 beforehand (of course the vehicle speed V as a parameter value is more detailed), and a corresponding value is selected from this EPS base target torque map in step S202.

Returning to FIG. 5, the ECU 100 calculates an EPS final target torque TTG according to Expression (2) below based on the EPS base target torque TBASE calculated in step S202 and the LKA target assist torque TLK calculated and stored earlier (step S203).

$$TTG = TBASE + TLK \quad (2)$$

When the EPS final target torque TTG is calculated, the ECU 100 controls the EPS driving device 500 based on this calculated EPS final target torque TTG, and directs the EPS motor of the EPS actuator 400 to output assist torque TA corresponding to this EPS final target torque TTG (step S204). Once step S204 is executed, the process returns to step S101.

In this way, in this example embodiment, the EPS actuator 400 functions as a main system for directing the vehicle 10 to follow the target running path. The LKA target assist torque TLK for making the vehicle 10 follow the target running path is output in addition to the usual assist torque that corresponds to a steering operation by the driver.

Meanwhile, the EPS actuator 400 does not change the relationship between the steering angle of the steering wheel 11 and the actual steering angle of the steered wheels, so when the vehicle 10 is being made to follow the target running path by assist torque being applied from the EPS actuator 400, the steering wheel 11 is steered, independently of the intention of the driver, according to a change in the steering angle of the steered wheels. This may feel odd to the driver, and thus may lead to the driver perform an unnecessary steering operation. Therefore, in this example embodiment, VGRS control is used to compensate for a change in behavior of the vehicle 10 when the EPS actuator 400 makes the vehicle 10 follow the target running path in this way.

Here, VGRS control will be described in detail with reference to FIG. 7 that is a flowchart of VGRS control. Incidentally, portions of FIG. 7 that overlap with portions in FIG. 2 will be denoted by the same reference characters and descriptions of those portions will be omitted as appropriate.

Figure 7:
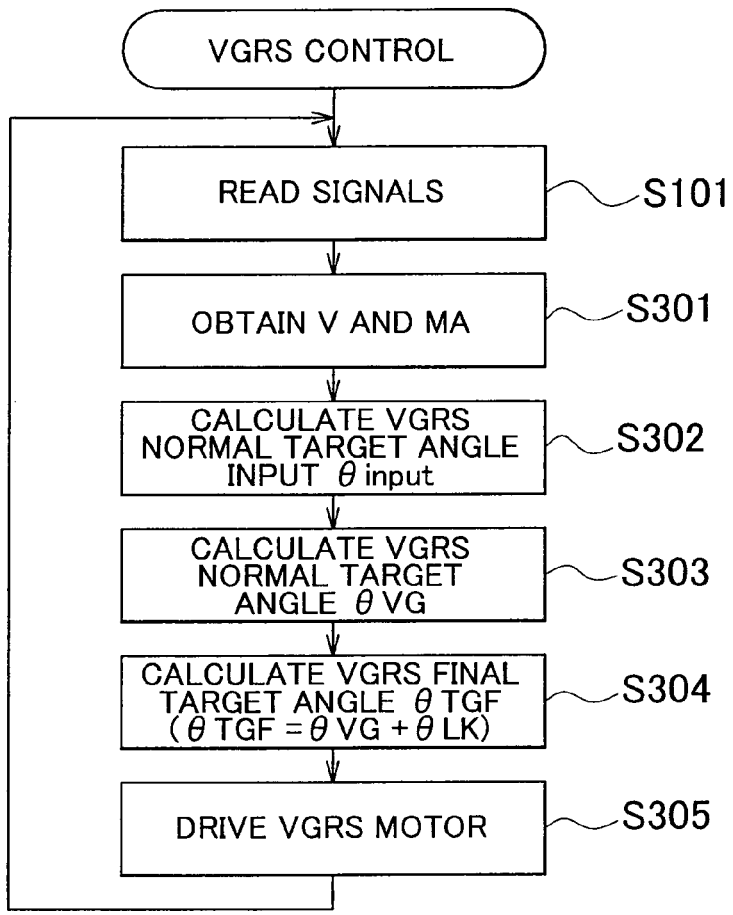
FIG. 7 is a flowchart of VGRS control according to the first example embodiment.

In FIG. 7, the ECU 100 first reads various signals (step S101), and then obtains the vehicle speed V and the steering angle MA (step S301), and calculates a VGRS normal target angle input θinput according to Expression (3) below (step S302).

$$\theta input = MA - \theta maref \quad (3)$$

Here, θmaref is the LKA steering angle that is the steering angle of the steering wheel 11 during LKA control and is determined by Expression (4) below.

$$\theta maref = \theta LKB - \theta LK \quad (4)$$

As evident from Expressions (3) and (4) above, the VGRS normal target angle input θinput is the amount of change in the steering angle of the steering wheel 11 with the LKA steering angle required for LKA control as the reference. That is, the VGRS normal target angle input θinput is one example of the driver steering input of the invention. If there is no driver steering input, i.e., if the driver does not perform any type of override operation, the steering angle MA is equal to the LKA steering angle, and the VGRS normal target angle input θinput is zero.

The ECU 100 then calculates a VGRS normal target angle θVG, which is a base value of a relative rotation angle of the lower steering shaft 13 with respect to the steering angle MA that is the rotation angle of the upper steering shaft 12, according to Expression (5) below based on the value obtained in step S301 and this VGRS normal target angle input θinput (step S303).

$$\theta VG = K1 \times input \quad (5)$$

Figure 8:
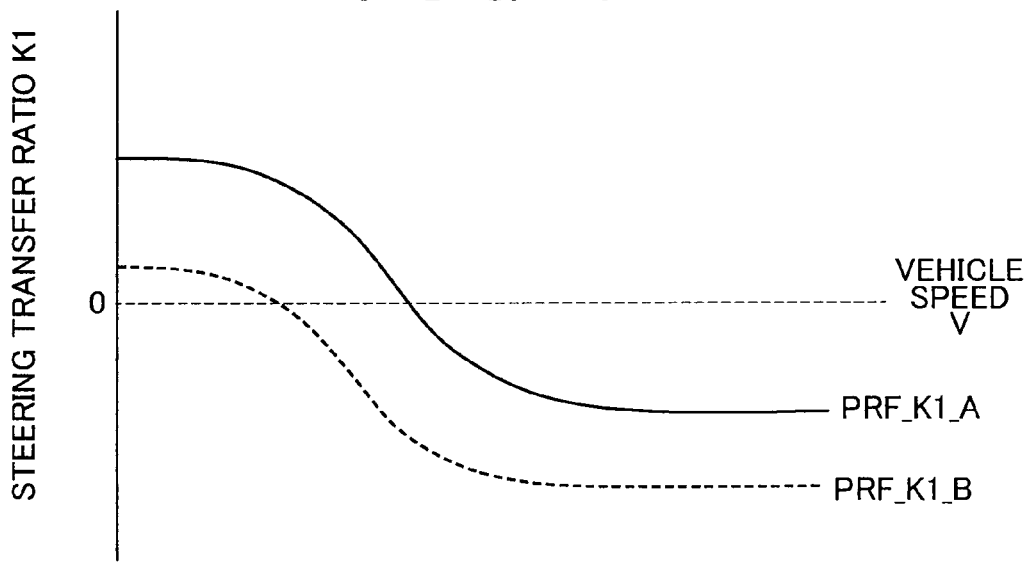
FIG. 8 is a view showing a frame format of the relationship between a steering transfer ratio and vehicle speed, according to the first example embodiment.

In Expression (5), K1 is a steering transfer ratio that defines the rotation angle of the lower steering shaft 13 with respect to the steering angle MA, and is a numerical value that varies according to the vehicle speed V. Here, the relationship between the steering transfer ratio K1 and the vehicle speed V will be described with reference to FIG. 8. FIG. 8 is a view showing a frame format of the relationship between the steering transfer ratio K1 and the vehicle speed V.

In FIG. 8, PRF_K1_A (the solid line) is a vehicle speed-sensitive characteristic of the steering transfer ratio K1 when LKA control is not being executed, and PRF_K1_B (the broken line) is the same vehicle speed-sensitive characteristic when LKA control is being executed.

When LKA control is not being executed, the steering transfer ratio K1 is 0 (i.e., the rotation ratio of the upper steering shaft 12 and the lower steering shaft 13 is 1:1) at a vehicle speed in the mid vehicle speed range, greater than 0 at a vehicle speed lower than the mid vehicle speed range, and less than 0 at a vehicle speed higher than the mid vehicle speed range. That is, a greater change in steering angle of the steered wheels can be obtained with a smaller steering angle of the steering wheel 11 at a lower vehicle speed. This is due to the fact that the lateral acceleration with respect to the steering angle of the steered wheels increases as the vehicle speed increases as described above.

On the other hand, the steering transfer ratio K1 when LKA control is being executed has substantially the same waveform as when LKA control is not being executed, but is offset more to the lower side. That is, the steering transfer ratio K1 is less than 0 in almost all vehicle speed ranges with the exception of the extremely low vehicle speed range, and the change in the steering angle of the steered wheels with respect to the steering angle of the steering wheel 11 is less than it is when LKA control is not being executed. This is because when LKA control is being executed, the vehicle 10 is controlled to automatically follow the target running path so a loss of running stability of the vehicle 10 due to the effect of a disturbance caused by a steering operation by the driver or the like is effectively suppressed.

Returning to FIG. 7, the ECU 100 also calculates a VGRS final target angle θTGF according to Expression (6) based on this calculated VGRS normal target angle θVG and the LKA corrected target angle θLK calculated and stored earlier (step S304).

$$\theta TGF = \theta VG + \theta LK \qquad (6)$$

Once the VGRS final target angle θTGF is calculated, the ECU 100 controls the VGRS driving device 300 based on this calculated VGRS final target angle θTGF, and rotates the VGRS motor 202 of the VGRS actuator 200 an amount corresponding to this VGRS final target angle θTGF (step S305). Once step S305 is executed, the process returns to step S101.

In this way, according to VGRS control in this example embodiment, the LKA corrected target angle θLK is added separately to the normal VGRS target angle, so a change in the steering angle MA when the vehicle 10 is made to follow the target running path by EPS control described earlier can be suppressed. Therefore, an odd feeling imparted to the driver is reduced, which enables the psychological load on the driver to be reduced, so the behavior of the vehicle 10 can be stabilized.

Meanwhile, in view of suppressing a change in the steering angle MA with the LKA corrected target angle θLK in this way, there is no need to change the change characteristic (i.e., the steering transfer ratio K1) of the rotation angle of the lower steering shaft 13 with respect to the steering angle MA when reducing the steering angle MA in VGRS control in this example embodiment. Therefore, it is no longer necessary to reduce the effect that a change in the steering angle of the steered wheels caused by EPS control has on the steering angle of the steering wheel 11 by increasing the steering transfer ratio K1. As a result, the problem of an increase in the change in the steering angle of the steered wheels with respect to a steering operation by the driver making the vehicle behavior unstable, which occurs when such steps are taken, is also able to be solved. In particular, in this example embodiment, the steering transfer ratio K1 is reduced compared with when this kind of control to make the vehicle 10 automatically follow the target running path is not performed, as described above. Therefore, while LKA control is being executed, the effect that a steering input that is a disturbance (such as the steering wheel grab) has on the steering angle of the steered wheels can be reduced even more.

Next, the process related to step S104 (i.e., the calculations of the lateral difference Y and the yaw angle difference φ) in LKA control will be described in detail.

A steering input by the driver that is a so-called override operation may occur even when LKA control is being executed. An override operation is a steering input that is based on a steering intention of the driver, and that is intended to be reflected in the steering angle of the steered wheels and differs from steering wheel grab or some other unintentional steering operation, for example. Incidentally, as shown in FIG. 8, the steering transfer ratio K1 is set small with respect to a steering input that occurs while LKA control is being executed, so an override operation by the driver while LKA control is being executed is less apt to be reflected in a change in the steering angle of the steered wheels. Also, while LKA control is being executed, even if the steering angle of the steered wheels is changed according to an override operation by the driver, a change in the lateral difference Y and the yaw angle difference φ brought about by this change in the steering angle of the steered wheels is instantly suppressed in the determination process of the target lateral acceleration GYTG that is feedback control. That is, unless some sort of steps are taken, LKA control will excessively interfere with an override operation by the driver, so even if the driver wants to make the vehicle 10 follow a running path that is off to the left or the right of the target running path (e.g., the center of the lane or the like) that is prepared by the system, it is difficult to do so.

Meanwhile, if an attempt is made to correct each feedback gain (such as Ky or Kφ) that makes up the calculation logic of the target lateral acceleration GYTG so as to reduce the effect of each difference with respect to the target lateral acceleration GYTG, as described above, the convergence speed and the convergence accuracy of a position change due to a crosswind or a road gradient, which are disturbance elements that differ from an override operation, end up decreasing. Such a decrease in the convergence speed and convergence accuracy is undesirable as it results in an extreme decrease in the control quality itself of LKA control. Therefore, in this example embodiment, the lateral difference Y and the yaw angle difference φ (i.e., the positional difference) that define the target lateral acceleration GYTG are calculated according to Expressions (7) and (8), respectively, below.

$$Y = Yref + \Delta Ycomp - Yt \qquad (7)$$

$$\phi = \phi ref + \Delta \phi comp - \phi t \qquad (8)$$

Here, in Expression (7), Yref is the target lateral position of the vehicle 10, ΔYcomp is the allowable lateral difference, and Yt is the actual lateral position of the vehicle 10. Incidentally, "Yref−Yt" in Expression (7) above is the lateral difference in the strictest sense with respect to the target running path in actual control. The ECU 100 is able to make this calculation directly based on the image data provided by the onboard camera 20. Also, in Expression (8), φref is a target yaw angle of the vehicle 10, Δφcomp is an allowable yaw angle difference, and φt is the actual yaw angle of the vehicle 10. Incidentally, "φref−φt" in Expression (8) above is the yaw angle difference in the strictest sense with respect to the target running path in actual control. The ECU 100 is able to make this calculation directly based on the image data provided by the onboard camera 20.

Meanwhile, the allowable lateral difference ΔYcomp is calculated according to Expression (9) below.

$$\Delta Ycomp = K3 \times \Delta Ybase \qquad (9)$$

In Expression (9) above, ΔYbase is the base allowable lateral difference, and K3 is the lateral difference correcting gain that varies according to the running path radius R.

Figure 9:
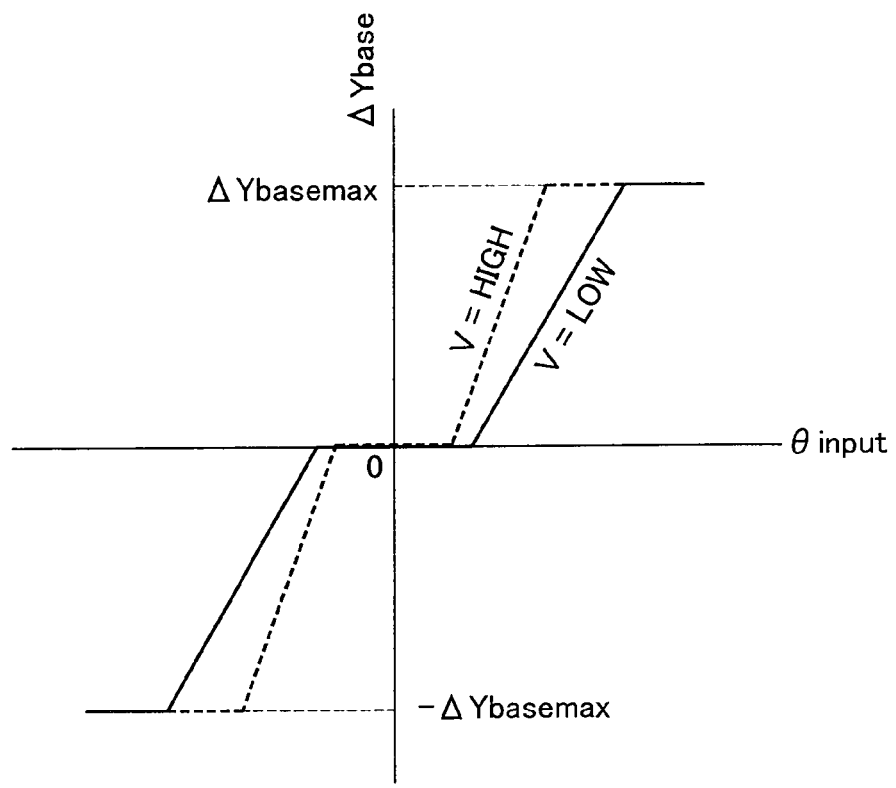
FIG. 9 is a view showing a frame format of the relationship between a VGRS normal target angle input and a base allowable lateral difference, according to the first example embodiment.

Here, the base allowable lateral difference ΔYbase will be described reference to FIG. 9. FIG. 9 is a view showing a frame format of the relationship between the VGRS normal target angle input θinput and the base allowable lateral difference ΔYbase.

In FIG. 9, the base allowable lateral difference ΔYbase is equivalent to the VGRS normal target angle input θinput in both the left and right steering directions, and monotonically increases with respect to the VGRS normal target angle input θinput except for in i) an undetectable region where the VGRS normal target angle input θinput is extremely small (incidentally, this undetectable area fulfills a type of threshold role for determining whether there is an override operation that is based on a clear steering intention of the driver), and ii) a restricted region where the base allowable lateral difference ΔYbase is restricted to an upper limit value ΔYbasemax and the VGRS normal target angle input Δinput is relatively large.

However, this base allowable lateral difference ΔYbase is a function of the vehicle speed V and has a tendency to rise earlier and saturate earlier on the high vehicle speed side (which corresponds to V=HIGH (the broken line) in the drawing) than on the low vehicle speed side (which corresponds to V=LOW (the solid line) in the drawing). This is because a change in the behavior of the vehicle 10 with respect to a change in the steering angle of the steered wheels occurs earlier and is greater as the vehicle speed increases.

Incidentally, the maximum value of the base allowable lateral difference ΔYbase is empirically modified beforehand so that the vehicle 10 does not depart from the original target running path (i.e., a given lane) of LKA control. In addition, if a steering input occurs that causes the vehicle 10 to depart from the lane, it is preferable to have LKA control end quickly.

Figure 10:
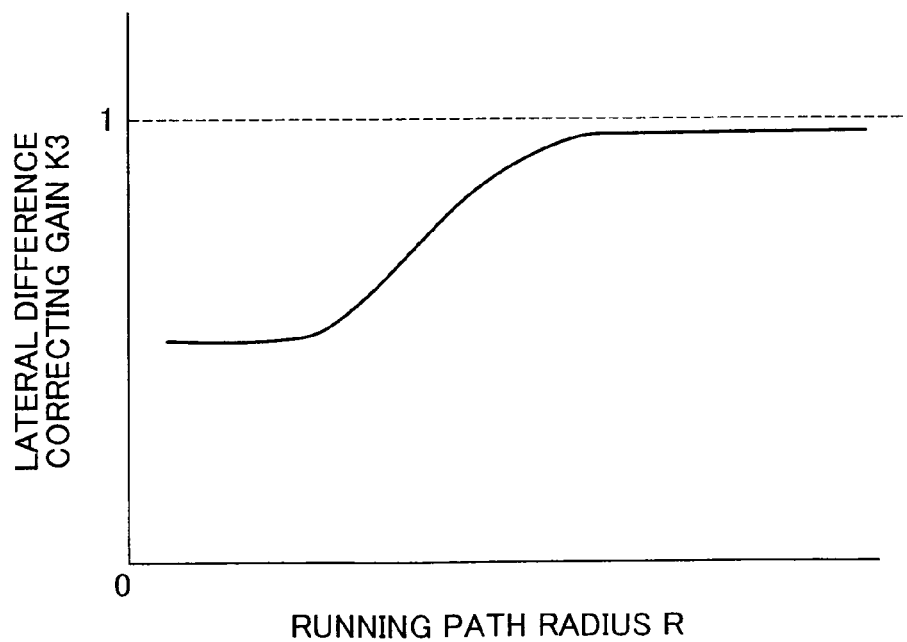
FIG. 10 is a view showing a frame format of the relationship between a running path radius and a lateral difference correcting gain, according to the first example embodiment.

Next, the lateral difference correcting gain K3 will be described with reference to FIG. 10. FIG. 10 is a view showing a frame format of the relationship between the running path radius R and the lateral difference correcting gain K3.

In FIG. 10, the lateral difference correcting gain K3 employs a maximum value near 1 (i.e., an appropriate value; this is only one example) in a substantially straight region where the running path radius R is large, and employs a minimum value near 0.5 (i.e., an appropriate value; this is only one example) in a sharp curve region where the running path radius R is extremely small. Also, the transition period during a change from a sharp curve region to a substantially straight region gradually increases toward the maximum value.

In view of the characteristics of the base allowable lateral difference ΔYbase and the lateral difference correcting gain K3, the allowable lateral difference ΔYcomp employs a value near the ΔYbasemax as the maximum value in an area where the VGRS normal target angle input θinput is relatively large in a substantially straight region, and employs zero as the minimum value in an area where the VGRS normal target angle input θinput is relatively small in a sharp curve region.

Here, the allowable lateral difference ΔYcomp is added to the lateral difference Y in feedback control, according to Expression (7) described above. Therefore, when there is an override operation by the driver as a steering input, more lateral difference in that steering direction is allowed as the degree of that override operation increases. That is, when the vehicle 10 starts to veer in the steering direction as a result of an override operation, the lateral difference Y of the control is in a direction that converges on a convergence value determined by the allowable lateral difference ΔYcomp, so the target lateral acceleration GYTG no longer acts in a direction that impedes a change in the steering angle of the steered wheels by the override operation.

Therefore, when there is an override operation, the vehicle 10 is able to be made to quickly follow a target running path that reflects the steering intention of the driver (i.e., a virtual running path that deviates accordingly from the original target running path). Meanwhile, the allowable lateral difference ΔYcomp is one example of the allowable range of the positional difference of the invention, which affects only the calculation of the lateral difference Y in a limited way. The followability and the convergence of LKA control with respect to a disturbance input caused by a crosswind or a road gradient or the like remain secure. That is, according to this example embodiment, the control quality of LKA control is able to be reliably secured while LKA control is prevented from excessively interfering with steering angle control by an override operation.

Next, the allowable yaw angle difference Δφcomp is calculated according to Expression (10) below.

$$\Delta\phi comp = K4 \times \Delta\phi base \qquad (10)$$

In Expression (10) above, Δφbase is the base allowable yaw angle difference and K4 is the yaw angle difference correcting gain that varies according to the running path radius R.

Figure 11:
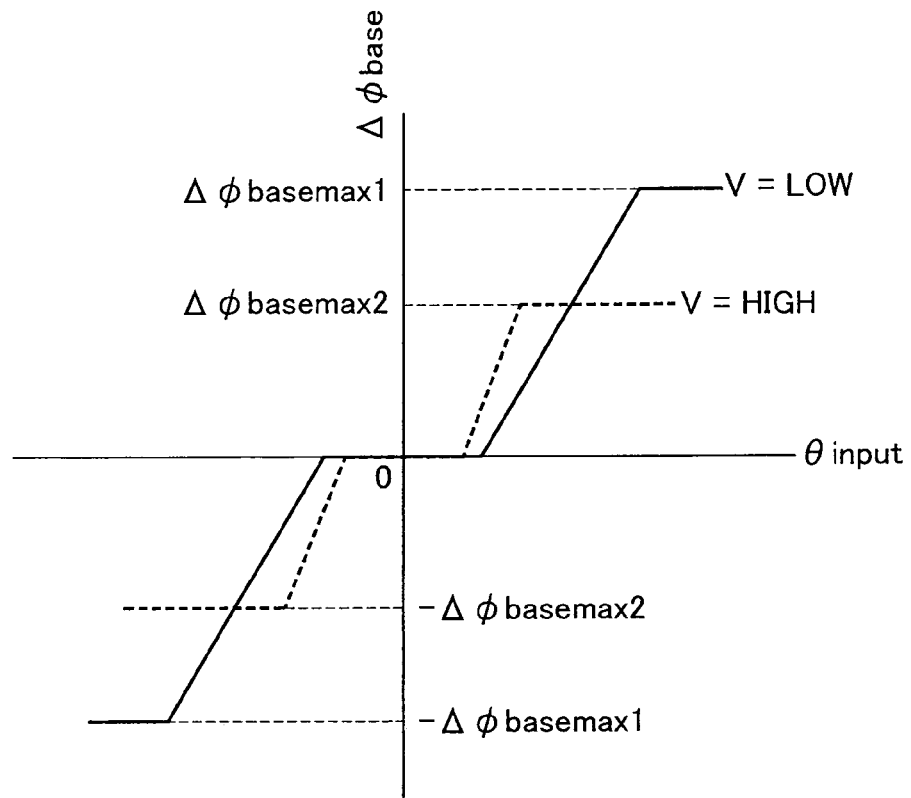
FIG. 11 is a view showing a frame format of the relationship between the VGRS normal target angle input and a base allowable yaw angle difference, according to the first example embodiment.

Here, the base allowable yaw angle difference Δφbase will be described with reference to FIG. 11. FIG. 11 is a view showing a frame format of the relationship between the VGRS normal target angle input θinput and the base allowable yaw angle difference Δφbase.

In FIG. 11, the base allowable yaw angle difference Δφbase is equivalent to the VGRS normal target angle input θinput in both the left and right steering directions, and monotonically increases with respect to the VGRS normal target angle input θinput except for in i) an undetectable region where the VGRS normal target angle input θinput is extremely small (incidentally, this undetectable area fulfills a type of threshold role for determining whether there is an override operation that is based on a clear steering intention of the driver), and ii) a restricted region where the base allowable yaw angle difference Δφbase is restricted to an upper limit value Δφbasemax (that differs according to vehicle speed) and the VGRS normal target angle input θinput is relatively large.

However, this base allowable yaw angle difference Δφbase is a function of the vehicle speed V and has a tendency to rise earlier and saturate earlier, and have a lower maximum value, on the high vehicle speed side (which corresponds to V=HIGH (the broken line) in the drawing) than on the low vehicle speed side (which corresponds to V=LOW (the solid line) in the drawing) (Δφbasemax1>Δφbasemax2). This is because a change in the behavior of the vehicle 10 with respect to a change in the steering angle of the steered wheels occurs earlier and is greater as the vehicle speed increases.

Incidentally, the maximum value of the base allowable yaw angle difference Δφbase is empirically modified beforehand so that the maximum lateral acceleration allowed in LKA control is not exceeded.

Figure 12:
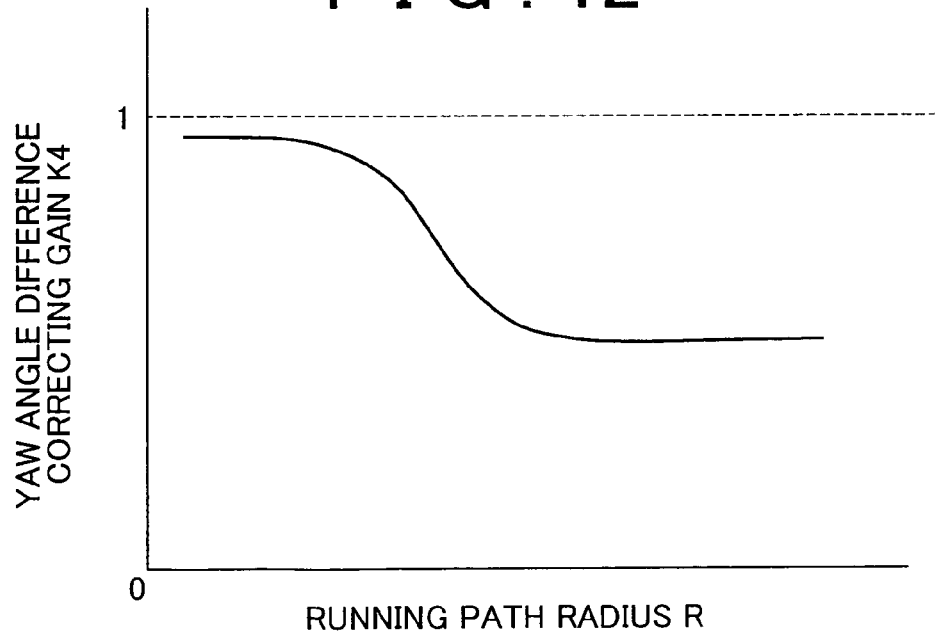
FIG. 12 is a view showing a frame format of the relationship between the running path radius and a yaw angle difference correcting gain, according to the first example embodiment.

Next, a yaw angle difference correcting gain K4 will be described with reference to FIG. 12. FIG. 12 is a view showing a frame format of the relationship between the running path radius R and the yaw angle difference correcting gain K4.

In FIG. 12, the yaw angle difference correcting gain K4 employs a maximum value near 1 (i.e., an appropriate value; this is only one example) in a sharp curve region where the running path radius R is extremely small, and employs a minimum value near 0.5 (i.e., an appropriate value; this is only one example) in a substantially straight region where the running path radius R is large. Also, the transition period during the change from a sharp curve region to a substantially straight region gradually decreases toward the minimum value.

In view of the characteristics of the base allowable yaw angle difference Δφbase and the yaw angle difference correcting gain K4, the allowable yaw angle difference Δφcomp employs a value near the Δφbasemax as the maximum value in an area where the VGRS normal target angle input θinput is relatively large in a sharp curve region, and employs zero as the minimum value in an area where the VGRS normal target angle input θinput is relatively small in a substantially straight region.

Here, the allowable yaw angle difference Δφcomp is added to the yaw angle difference φ in feedback control, according to Expression (8) described above. Therefore, when there is an override operation by the driver as a steering input, more yaw angle difference is allowed as the degree of that override operation increases. That is, when the vehicle 10 starts to veer in the steering direction as a result of an override operation, the yaw angle difference φ of the control is in a direction that converges on a convergence value defined by the allowable yaw angle difference Δφcomp, so the target lateral acceleration GYTG no longer acts in a direction that impedes a change in the steering angle of the steered wheels by the override operation.

Therefore, when there is an override operation, the vehicle 10 is able to be made to quickly follow a target running path that reflects the steering intention of the driver (i.e., a virtual running path that deviates accordingly from the original target running path). Meanwhile, the allowable yaw angle difference Δφcomp is one example of the allowable range of the positional difference of the invention, which effects only the calculation of the yaw angle difference φ in a limited way. The followability and the convergence of LKA control with respect to a disturbance input caused by a crosswind or a road gradient or the like remain secure. That is, according to this example embodiment, the control quality of LKA control is able to be reliably secured while LKA control is prevented from excessively interfering with steering angle control by an override operation.

Also, the relationship between the yaw angle difference correcting gain K4 and the lateral difference correcting gain K3 is the exact opposite with respect to the running path radius R, such that in a sharp curve region where the running path radius R is small, the yaw angle difference φ can be more dominantly reflected in the calculation of the target lateral acceleration GYTG, and in the substantially straight region where the running path radius R is large, the lateral difference Y can be more dominantly reflected in the calculation of the target lateral acceleration GYTG. More specifically, when a yaw angle difference that ordinarily should not be large is overly allowed when the vehicle 10 is traveling in a straight line, the behavior of the vehicle 10 may easily become unstable and the stability of LKA control may decrease, such that when the vehicle 10 is turning, the yaw angle difference is able to more accurately indicate the behavior of the vehicle than the lateral difference.

As described above, with the vehicle 10 in this example embodiment, when the control amount of the VGRS actuator 200 (which is one example of the control amount of the steering force applying device of the invention) is determined while LKA control is being executed, if there is an override operation by the driver, an allowance is set for both the lateral difference Y and the yaw angle difference φ of the vehicle 10 that define the, target lateral acceleration GYTG, such that vehicle behavior in the steering direction that is determined by the override operation is allowed accordingly. That is, from a relative view, the target running path itself shifts in the steering direction related to an override operation. Therefore, a steering intention of the driver is able to be accurately reflected in the vehicle behavior without affecting the convergence or the followability of LKA control in any way.

Incidentally, in this example embodiment, the differences are corrected by setting the allowable lateral difference ΔYcomp that defines the lateral difference Y and the allowable yaw angle difference Δφcomp that defines the yaw angle difference φ, as described above. However, in view of the fact that these difference corrections are beneficial in that they effectively shift the running path to be followed by the vehicle 10 from the original target running path, when there is an override operation, the ECU 100, instead of these difference corrections, may also shift the target running path itself a predetermined amount in the steering direction that is determined by the override operation. Accordingly, when there is an override operation, the steering intention of the driver can be reflected in the target running path, so the same effects as described above can be obtained.

Incidentally, in this example embodiment, the operation of the ARS actuator 600 that enables the rear wheels to be steered while LKA control is being executed is omitted in order to keep the description from becoming complicated. Of course, in rear wheel steering, when the rear wheels are steered to the right, the vehicle turns to the left, and when the rear wheels are steered to the left, the vehicle turns to the right, so fundamentally, the VGRS control related to the front wheels described above can be applied. Also, in this example embodiment, when there is an override operation while LKA control is being executed, the lateral difference Y mainly functions as a difference with respect to traveling straight ahead. This presumes coordinated phase control of both the front and rear wheels in a vehicle provided with a so-called four-wheel steering function such as the vehicle 10 in this example embodiment. Four-wheel coordinated phase control enables the behavior of the vehicle 10 with respect to an override operation when the vehicle 10 is traveling straight ahead to be changed extremely smoothly while suppressing a yaw angle difference from occurring.

In the first example embodiment, when there is an override operation while LKA control is being executed, a steering intention of the driver is reflected in the vehicle behavior by correcting the lateral difference Y and the yaw angle difference φ in the calculation process of the target lateral acceleration GYTG. However, a steering intention of the driver can also be reflected in the vehicle behavior along with setting the allowance value described above that is provided for these difference corrections. Such a case will be described next as a second example embodiment.

Figure 13:
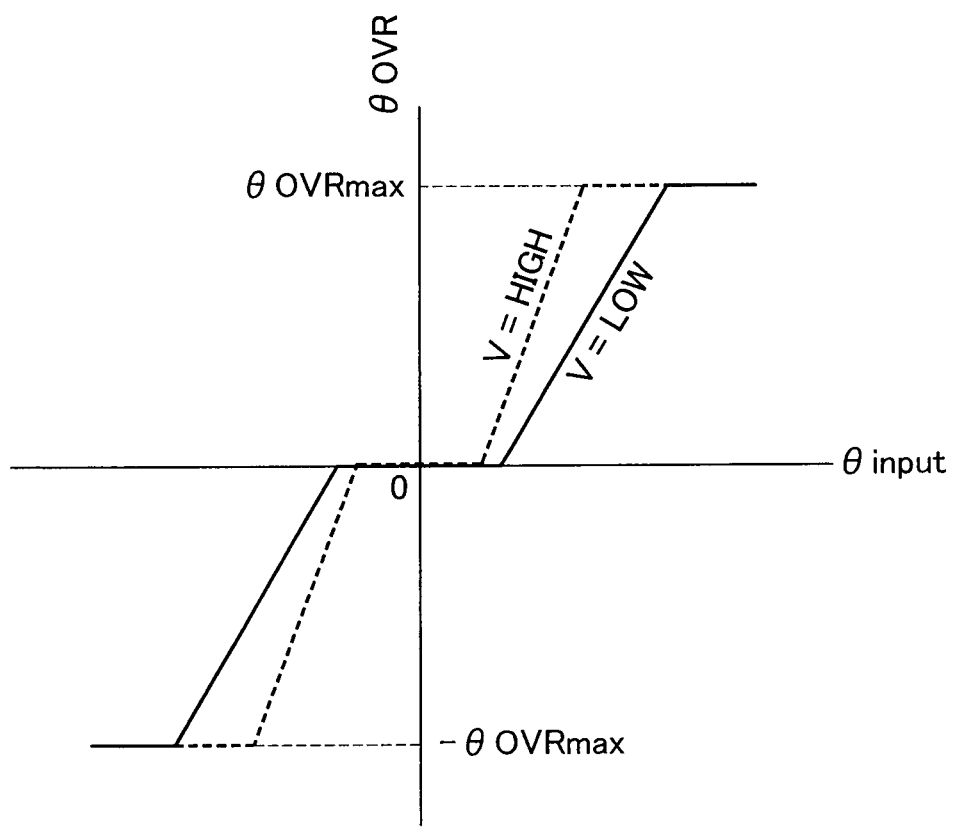
FIG. 13 is a view showing a frame format of the relationship between the VGRS normal target angle input and an override correction VGRS target angle, according to a second example embodiment of the invention.

Here, a second example embodiment of the invention based on this point will be described with reference to FIG. 13. FIG. 13 is a view showing a frame format of the relationship between a VGRS normal target angle input θinput and an override correction VGRS target angle θOVR.

The override correction VGRS target angle θOVR in FIG. 13 is a value that is used in step S304 in VGRS control. That is, in the second example embodiment, a VGRS final target angle θTGF in VGRS control is calculated according to Expression (11) below.

$$\theta TGF = \theta VG + \theta LK + \theta OVR \quad (11)$$

That is, when there is an override operation while LKA control is being executed, the control amount of the VGRS actuator 200 is directly corrected so as to be increased. The change characteristic of the override correction VGRS target angle θOVR with respect to the VGRS normal target angle input θinput is as shown in the drawing, i.e., it basically increases monotonically and is set larger according to the vehicle speed V, except for in an undetectable area and a restricted area (i.e., an area where it is restricted to a maximum value θOVRmax) that are the same as described above.

In this way, according to this example embodiment, the control amount of the VGRS actuator 200 is directly corrected. Here, similar to the allowable difference in the first example embodiment, this kind of correction is also outside the range of feedback control logic that determines the convergence and followability of LKA control, and thus does not affect the convergence and followability of LKA control. Therefore, deviation from the target running path due to a disturbance element such as a crosswind or a road gradient, for example, is able to be quickly converged without any problem. That is, an override operation by the driver is able to be accurately reflected in the vehicle behavior without reducing the control quality of LKA control.

The invention is not limited to the example embodiments described above. To the contrary, various modifications are possible within the scope of the invention as read from the claims and specification in its entirety. A vehicle control apparatus with such modifications is also included in the technical scope of the invention.

The invention may be used in a vehicle provided with a function that causes the vehicle to follow a target running path.

The invention claimed is:

1. A vehicle control apparatus that controls a vehicle provided with a steering force applying device capable of applying steering force to induce a change in a steering angle of a steered wheel to the steered wheel, comprising:
a difference detecting device that is configured to detect a positional difference that determines a relative positional relationship between a target running path to be maintained and the vehicle;
a determining device that is configured to determine a control amount of the steering force applying device in order to maintain a running path of the vehicle on the target running path, based on the detected positional difference;
a controller that is configured to maintain the running path on the target running path by controlling the steering force applying device according to the determined control amount;
a steering input detecting device that is configured to detect a steering input to a steering input device by a driver; and
a correcting device that is configured to (i) correct a determining reference of the control amount based on the detected steering input by the driver and (ii) prevent interference between the steering input by the driver and a steering force output by the steering force applying device by correcting the determining reference of the control amount independently of the controller maintaining the running path on the target running path,
wherein when the steering input by the driver is detected by the steering input detecting device, the steering force applying device maintains the running path of the vehicle on the target running path while the steering input by the driver is input to the steering input device to control a steering direction of the vehicle.

2. The vehicle control apparatus according to claim 1, wherein the positional difference includes at least one of a yaw angle difference and a difference in a lateral position of the vehicle with respect to the target running path.

3. The vehicle control apparatus according to claim 1, wherein the steering force applying device includes a variable steering angle device capable of changing a relationship between a steering angle of the steering input device and the steering angle of the steered wheel, and the controller changes the steering angle of the steered wheel independently of a steering input by the driver via the variable steering angle device.

4. The vehicle control apparatus according to claim 1, wherein the determining reference is a condition that determines the positional difference.

5. The vehicle control apparatus according to claim 4, wherein the condition that determines the positional difference is an allowable range of the positional difference, and the correcting device expands the allowable range when the steering input is detected compared with when the steering input is not detected.

6. The vehicle control apparatus according to claim 1, wherein the steering input detecting device is capable of detecting a degree of the steering input, and the correcting device increases a correction amount of the determining reference as the detected steering input increases.

7. The vehicle control apparatus according to claim 1, wherein the correcting device changes a correction amount of the determining reference according to a running condition of the vehicle.

8. The vehicle control apparatus according to claim 1, wherein the correcting device corrects the determining reference within a predetermined limited range that is determined by an upper limit value.

9. The vehicle control apparatus according to claim 1, wherein the steering input detecting device is configured to be able to detect a degree of the steering input to the steering input device by the driver.

10. The vehicle control apparatus according to claim 1, wherein the correcting device shifts the target running path toward the steering direction of the vehicle based on the detected steering input.

* * * * *